(12) United States Patent
Sogabe et al.

(10) Patent No.: US 7,522,381 B2
(45) Date of Patent: Apr. 21, 2009

(54) RECORDING MEDIUM BUILT-IN CARTRIDGE AND CARTRIDGE BUILT-IN PACKAGE

(75) Inventors: Teruo Sogabe, Ibaraki (JP); Tsugihiro Doi, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 442 days.

(21) Appl. No.: 11/376,200

(22) Filed: Mar. 16, 2006

(65) Prior Publication Data

US 2006/0208122 A1     Sep. 21, 2006

(30) Foreign Application Priority Data

Mar. 17, 2005   (JP) ............................. 2005-077572

(51) Int. Cl.
G11B 23/02    (2006.01)
(52) U.S. Cl. ..................................................... 360/132
(58) Field of Classification Search ............. None
See application file for complete search history.

(56) References Cited

U.S. PATENT DOCUMENTS

| 5,453,897 A | * | 9/1995 | Bakerman | 360/132 |
| 5,651,171 A | * | 7/1997 | Nelson | 29/460 |
| 6,587,307 B1 | * | 7/2003 | Raymond et al. | 360/137 |

FOREIGN PATENT DOCUMENTS

| JP | 7-242275 A | 9/1995 |
| JP | 7-287955 A | 10/1995 |

* cited by examiner

*Primary Examiner*—Mark Blouin
(74) *Attorney, Agent, or Firm*—Birch, Stewart, Kolasch & Birch, LLP

(57) ABSTRACT

A recording medium built-in cartridge of the present invention includes: a case; a recording medium housed in the case; and at least one humidity control member disposed in the case and including at least one humidity control material that absorbs moisture in the case when a humidity in the case is a first humidity or higher and emits the moisture to the case when the humidity in the case is a second humidity or lower, the second humidity being lower than the first humidity.

19 Claims, 8 Drawing Sheets

RECORDING MEDIUM BUILT-IN CARTRIDGE AND CARTRIDGE BUILT-IN PACKAGE

BACKGROUND OF THE INVENTION

1. Field of the Invention

The present invention relates to a recording medium built-in cartridge including a recording medium built in a case. The present invention further relates to a cartridge built-in package including a recording medium built-in cartridge and a housing case capable of housing the recording medium built-in cartridge in an enclosed space.

2. Description of Related Art

Humidity is one of the major factors for degrading the properties of recording media such as magnetic tapes, magnetic disks and IC memory. If a recording medium built-in cartridge including these recording media built in a case is kept for a long time in humid surroundings, the recording media may erode or bacteria may propagate themselves. In recent years, ordinary housing has been improved in the air tightness, thus causing condensation easily. Recording medium built-in cartridges for general consumers are used and kept in such surroundings. Recording medium built-in cartridges for companies such as banks are required to have more excellent long-term storage capabilities than those required for products aimed at general consumers, so that they need to be kept in the surroundings where the humidity and the like are controlled. In practice, however, they rarely are kept in ideal surroundings.

In such a background, moisture exclusion devices for recording medium built-in cartridges or the like are disclosed. For instance, JP H07(1995)-242275 A discloses a moisture exclusion device provided with a desiccant such as silica gel housed in a case and a moisture permeable film provided at an opening of the case. This moisture exclusion device has approximately the same shape as that of a recording medium built-in cartridge (e.g., videotape cassette), and is kept in a housing rack together with recording medium built-in cartridges, thereby excluding the moisture from the recording medium built-in cartridges.

However, when the inside of the recording medium built-in cartridge is dried excessively, the characteristics of the recording medium are affected adversely. For example, in the instance of a tape cartridge including a case and a magnetic tape (recording medium) disposed in the case, a lubricant included in the magnetic tape may evaporate, thus degrading the magnetic tape.

Therefore, with the foregoing in mind, it is an object of the present invention to provide a recording medium built-in cartridge capable of keeping the humidity in a case within a predetermined range. Further, it is another object of the present invention to provide a cartridge built-in package including a recording medium built-in cartridge and a housing case capable of housing the recording medium built-in cartridge in an enclosed state, the cartridge built-in package capable of keeping the humidity in the case of the recording medium built-in cartridge within a predetermined range.

SUMMARY OF THE INVENTION

A recording medium built-in cartridge of the present invention includes: a case; a recording medium housed in the case; and a humidity control member disposed in the case and including at least one humidity control material that absorbs moisture in the case when a humidity in the case is a first humidity or higher and emits the moisture to the case when the humidity in the case is a second humidity or lower, the second humidity being lower than the first humidity.

A cartridge built-in package of the present invention includes: a recording medium built-in cartridge including a case having an air vent and a recording medium housed in the case; a housing case in which the recording medium built-in cartridge is housed so that the recording medium built-in cartridge can be loaded or unloaded with respect to the housing case; and a humidity control member secured to an outer surface of the case of the recording medium built-in cartridge and including at least one humidity control material that absorbs moisture in the housing case when a humidity in the housing case is a first humidity or higher and emits the moisture to the housing case when the humidity in the housing case is a second humidity or lower, the second humidity being lower than the first humidity.

These and other advantages of the present invention will become apparent to those skilled in the art upon reading and understanding the following detailed description with reference to the accompanying figures.

DETAILED DESCRIPTION OF THE INVENTION

The following describes exemplary recording medium built-in cartridges (hereinafter this may be called "cartridge" simply) and an exemplary cartridge built-in package of the present invention, with reference to the drawings.

EMBODIMENT 1

In Embodiment 1, a tape cartridge is exemplified as one example of the cartridge of the present invention.

Figure 1:
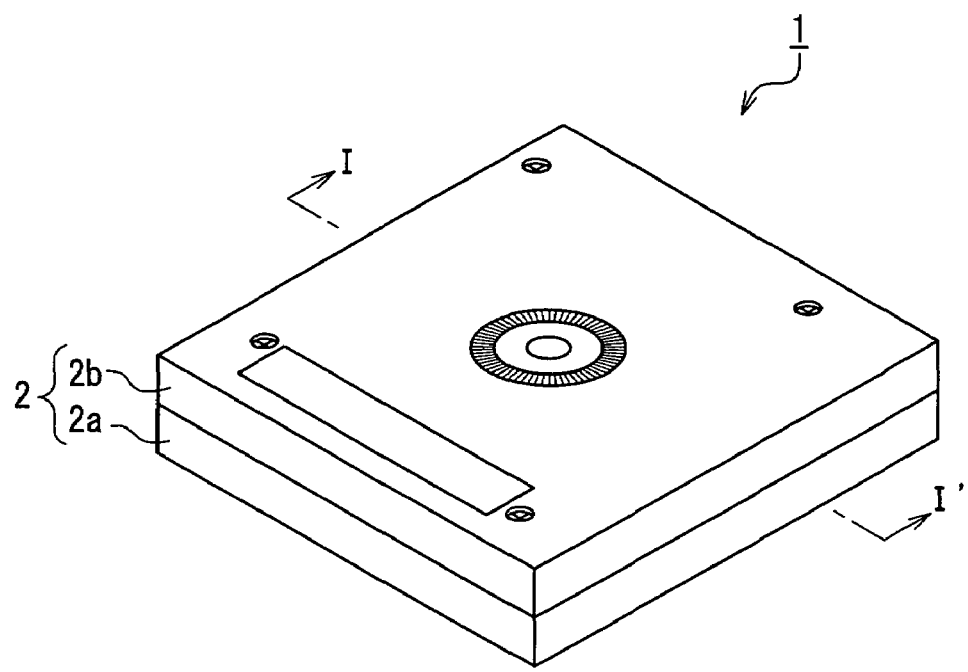
FIG. 1 is a perspective view of an exemplary recording medium built-in cartridge of Embodiment 1.
Figure 2:
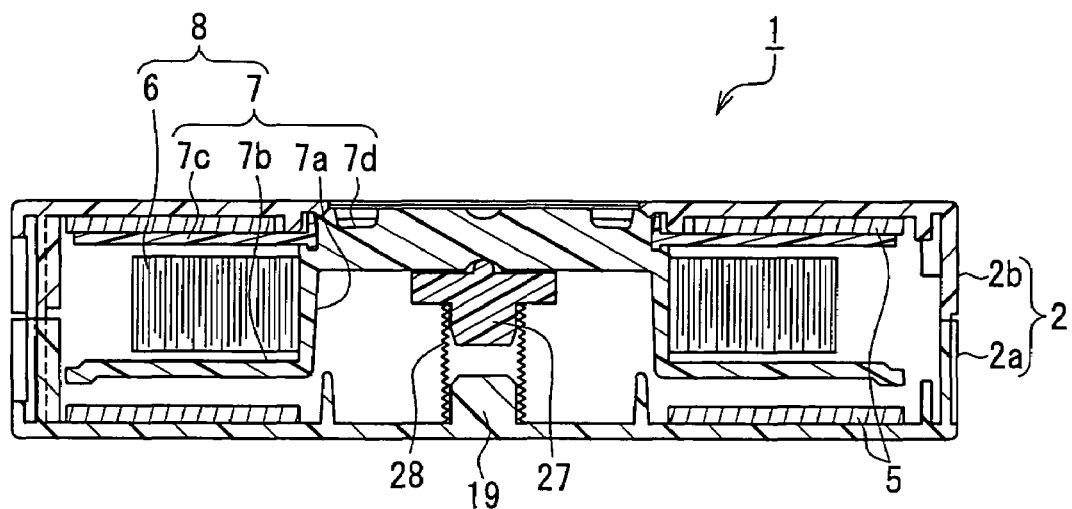
FIG. 2 is a cross-sectional view of the recording medium built-in cartridge of FIG. 1 taken along I-I' of FIG. 1.
Figure 3:
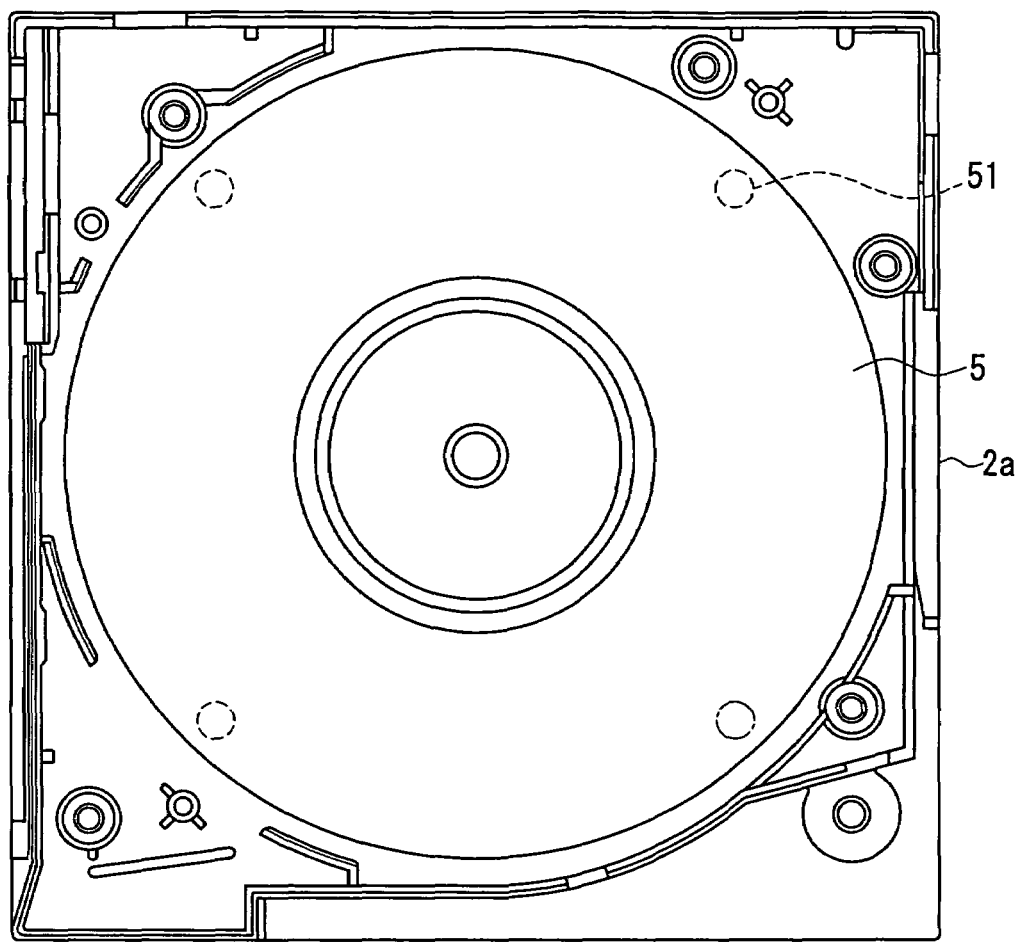
FIG. 3 is a plan view showing the inside of a first container of FIG. 1.

FIG. 1 is a perspective view of an exemplary cartridge of the present embodiment, and FIG. 2 is a cross-sectional view of the cartridge of FIG. 1 taken along I-I' of FIG. 1. FIG. 3 is a plan view showing the inside of a first container of FIG. 1.

Note here that FIG. 1 and FIG. 2 show the state where a first container 2a is below a second container 2b for convenience in explanations. However, during the normal operation, the first container 2a is used above the second container 2b.

As shown in FIG. 2, the cartridge 1 of the present embodiment shown in FIG. 1 is provided with a case 2 and a magnetic tape 6 housed in the case 2. The case 2 is formed so that the first container 2a and the second container 2b are aligned to form an internal space therebetween and are fastened by screws or the like. The magnetic tape 6 is wound around a reel 7 that is rotatably housed in the case 2, and the magnetic tape 6 can be unreeled from the reel 7 and pulled out of the case 2 through an opening (not illustrated) of the case 2. At the unreeling end of the magnetic tape 6, a lead made of metal (not illustrated) is secured, and when the tape cartridge is loaded in a drive, the lead is captured by a connection device of the drive.

In the case 2, the reel 7 is pressed and biased upwardly in FIG. 2 by an elastic body like a spring such as a compression coil spring 28 or the like that acts via a shaft 27. Thereby, the reel 7 can be prevented from rotating freely during the non-operating state. Note here that a guide projection 19 is provided substantially at the center of the bottom part of the first container 2a, the guide projection 19 having the outer diameter smaller than the inner diameter of the compression coil spring 28. This guide projection 19 is inserted into a bore of the compression coil spring 28, whereby the displacement of the compression coil spring 28 can be suppressed.

The reel 7 has a shaft part 7a around which the magnetic tape 6 is wound, a disk-shaped first flange 7b formed integrally with the shaft part 7a and a second flange 7c melted to be secured to the shaft part 7a. The shaft part 7a is in a substantially cylindrical shape with bottom and has a cavity therein. The outer surface of the bottom part of the shaft part 7a is provided with an engagement gear 7d capable of engaging with a gear (not illustrated) of a driving shaft of the drive. The outer surface of the bottom part of the shaft part 7a is exposed to the outside of the case 2 through an opening of the bottom part of the second container 2b. The reel 7 rotates with the engagement gear 7d engaging with the driving gear of the driving shaft of the drive that is inserted into the case 2 through this opening. When the reel 7 rotates, the tape 6 is wound around the reel 7 or unreeled from the reel 7.

As shown in FIG. 2, the cartridge 1 of the present embodiment is provided with at least one humidity control member 5 disposed in the case 2, and the humidity control member 5 includes at least one humidity control material. The humidity control material has a property of absorbing the moisture in the case 2 when the humidity in the case 2 is a first humidity or higher (this may be called "moisture absorption") and emitting moisture to the case 2 when the humidity in the case 2 is a second humidity or lower, the second humidity being lower than the first humidity (this may be called "moisture emission"). Therefore, during the long-term storage of the cartridge 1, the moisture absorption and the moisture emission are repeated by the humidity control material in accordance with a humidity change in the storage surroundings, whereby the humidity in the case 2 can be kept within a predetermined range.

In this way, with the use of the cartridge 1 of the present embodiment, the humidity in the case 2 can be kept within a predetermined range even when the humidity changes in the storage surroundings. Thereby, in the cartridge 1 of the present embodiment, the degradation of the magnetic tape 6 due to a humidity change in the case 2 can be suppressed, and therefore the reliability is high.

The temperature in the case 2 changes depending on the temperature of the storage surroundings of the case 2. The temperature of the storage surroundings of the case 2 normally ranges from 10° C. to 60° C. The preferable humidity in this temperature range with consideration given to the moisture resistance of the magnetic tape 6 or the like is more than 30% and less than 90%, and more preferably more than 40% and less than 80%. Therefore, the first humidity where the moisture absorption by the humidity control material takes place preferably is a predetermined humidity within the range from 70% to 90%, for example, and the second humidity where the moisture emission by the humidity control material takes place is a predetermined humidity within the range from 30% to 50%. More preferably, the first humidity is 80% and the second humidity is 40%. Note here that the above-stated humidity is measured using ST-4 (round type, 4.5 cm) produced by Shinwa Rules Co., Ltd.

As the humidity control material, at least one type of porous material selected from the group consisting of B-type silica gel (specified in JIS Z 0701), diatomaceous earth, sepiolite, zeolite, coal ash, porous ceramics, charcoal and ultrahigh molecular weight polyethylene preferably is used, for example. Among them, diatomaceous earth, which can absorb the most moisture and has excellent responsivity for the absorption and emission of the moisture in accordance with the humidity change in the case 2, is preferable. The diatomaceous earth is not limited especially as to type, and Wakkanai diatomaceous earth whose pore diameter is 4 nm to 20 nm is preferable.

The Wakkanai diatomaceous earth includes the following components:

| | |
|---|---|
| $SiO_2$ | 79.47% |
| $Al_2O_3$ | 8.63% |
| $Fe_2O_3$ | 1.80% |
| $TiO_2$ | 0.32% |
| CaO | 0.24% |
| MgO | 0.87% |
| $Na_2O$ | 0.66% |
| $K_2O$ | 1.45% |
| $P_2O_2$ | 0.04% |

The B-type silica gel has a property of absorbing the moisture rapidly in an environment of high humidity and emitting the absorbed moisture gradually in an environment of low humidity.

The porous ceramics include alumina, zirconia, silicon nitride, silicon carbide and the like, for example, also exhibit the requisite properties and are suitable for use as the humidity control material.

Preferably, the ultrahigh molecular weight polyethylene includes one having a porous structure whose pore diameter is 10 nm or less, for example.

The amount of the at least one humidity control material contained in the humidity control member 5 is not limited especially, and this may be determined appropriately with consideration given to the capacity of the case 2 of the cartridge 1, the moisture absorption/emission properties of the humidity control material and the like. For instance, if the capacity of the case 2 is 200 to 800 cm$^3$, then the surface area of the humidity control member 5 effective for the humidity control preferably is 20 cm$^2$ to 200 cm$^2$. In this instance, if the Wakkanai diatomaceous earth is used as the humidity control material, the humidity control member 5 preferably contains 80 to 100 volume % of the Wakkanai diatomaceous earth.

This Wakkanai diatomaceous earth increases rapidly in the coefficient of the moisture absorption at the humidity of about 80% when the temperature is 10° C., and has a high coefficient of the moisture absorption at a high humidity. Therefore, the Wakkanai diatomaceous earth exhibits the moisture absorption function when the humidity in the housing case 10 is 80% or higher, and exhibits the moisture emission function when the humidity is 40% or lower. Further, similarly at the temperature of 60° C., the Wakkanai diatomaceous earth exhibits the moisture absorption function when the humidity in the housing case 10 is 80% or higher, and exhibits the moisture emission function when the humidity is 40% or lower. Although the moisture content in the air changes with a temperature, the moisture absorption/emission properties of the humidity control material themselves do not change. With the use of the humidity control member containing such diatomaceous earth as the humidity control material, the humidity in the housing case 10 and in the case 2 of the cartridge 1 can be kept within a range of more than 40% and less than 80% when the temperature ranges from 10° C. to 60° C.

The shape of the humidity control member 5 is not limited especially, and a shape enabling a larger surface area effective for the humidity control is preferable. For instance, a sheet form or a plate form, by which the surface area can be ensured easily, is preferable. The humidity control member 5 in the sheet form or the plate form is preferable also because it can be disposed in a limited space. Further, as in the example shown in FIG. 2 and FIG. 3, the humidity control member 5 preferably is in a disk-shape whose outer diameter is equal to or larger than the outer diameter of a wound body 8 including the reel 7 and the magnetic tape 6 wound around the reel 7.

Figure 4:
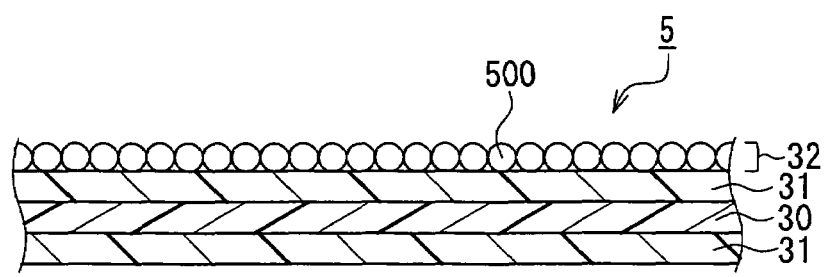
FIG. 4 is a cross-sectional view showing an exemplary humidity control member.

As the humidity control member 5 in the sheet form, as shown in FIG. 4, a lamination including a base 30 provided with adhesive layers 31 on the both principal surfaces and a humidity control layer 32 formed on one of the adhesive layers 31 and containing the powder of the above-stated humidity control material 500 is available, for example. As in this example, the humidity control member 5 may be a laminate comprised of two or more layers where the outermost layer on one side of the laminate is a humidity control layer 32 containing at least one humidity control material and the other outermost layer is an adhesive layer 31. This configuration is preferable because the humidity control member 5 can be secured to the case 2 easily. As the base 30, a resin film may be used, for example, and as the material of the adhesive layer 31, an acrylic adhesive may be used, for example. The humidity control layer 32 may contain a binder or the like, if required, in addition to the humidity control material 500.

Figure 5:
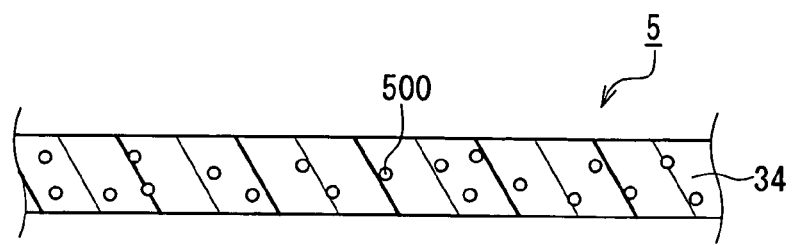
FIG. 5 is a cross-sectional view showing another exemplary humidity control member.

Further, as the humidity control member 5 in the sheet form, a sheet-form article made of a non-woven cloth 34 impregnated with the powder of the above-stated humidity control material 500 may be used, for example, as shown in FIG. 5. This sheet-form article can be obtained by immersing a non-woven cloth 34 in a dispersion medium whereby the powder of the humidity control material 500 is dispersed within gaps between the fibers.

As the humidity control member 5 in the plate form, a molded body obtained by compression-molding of the powder of the humidity control member using gas or the like can be used. A laminate layer containing a resin may be provided on one principal surface of the molded body so as to enhance the strength of the molded body. Further, the humidity control member 5 may contain a binder or the like, if required, in addition to the humidity control material 500. As the binder, an epoxy resin may be used, for example.

The position of the humidity control member 5 within the cartridge 1 is not limited especially, and this preferably is disposed between either the bottom part of the first container 2a or the bottom part of the second container 2b and the magnetic tape 6. In the example of FIG. 2, the humidity control members 5 are disposed between the bottom part of the first container 2a and the magnetic tape 6 and between the bottom part of the second container 2b and the magnetic tape 6. Therefore, the planar direction (radial direction) of the humidity control member 5 is orthogonal to the width direction of the tape, and the wound body 8 including the reel 7 and the magnetic tape 6 wound around the reel 7 is sandwiched between the pair of humidity control members 5. When the humidity control member 5 is disposed between at least one of the bottom part of the first container 2a and the bottom part of the second container 2b and the magnetic tape 6 as in this example, the humidity in the case 2 can be maintained uniformly and within a predetermined range.

Incidentally, when the humidity control member 5 disposed between at least one of the bottom part of the first container 2a and the bottom part of the second container 2b and the magnetic tape 6 is in a sheet form or in a plate form, the surface area of the humidity control member 5 (the surface area effective for the humidity control) in the principal surface direction of the case 2 (the same direction of the radial direction of the wound body 8) becomes larger than the surface area of the humidity control member 5 (the surface area effective for the humidity control) in the thickness direction of the case.

The method for securing the humidity control member 5 to the case 2 is not limited especially, and may be secured by adhesion using an adhesive, ultrasonic welding and the like, for example. There is no need to bond the entire face of the humidity control member 5 facing the case 2 to the case, and the face of the humidity control member 5 facing the case (in this example, the bottom part of the first container 2a) may be bonded partially (at portions 51) to the case 2, for example.

The material of the case 2 is not limited especially, and conventionally well-known materials for the case 2 may be used. For instance, resins such as polycarbonate (PC), acrylonitrile-butadiene-styrene copolymer (ABS), polystyrene (PS) and a polymer blend of PC and ABS are preferable.

The cartridge 1 of the present embodiment may be provided with an indicator (not illustrated) whose color tone changes with a humidity change in the case 2. This indicator preferably can be observed from the exterior of the case 2. Such an indicator provided in the cartridge 1 allows confirmation by observing from the exterior of the case 2 as to whether the storage condition is appropriate or not.

The indicator is not limited especially, and a commercially available one may be used. As an example of a commercially available indicator, a simplified humidity indicator card produced by Piatec cooperation is available.

The case 2 may be provided with a window for visual observation of the indicator. Alternatively, the case 2 partially or as a whole may be formed of a material having a high degree of transparency, so as to allow the indicator to be visually observed from the exterior of the case 2.

Figure 6:
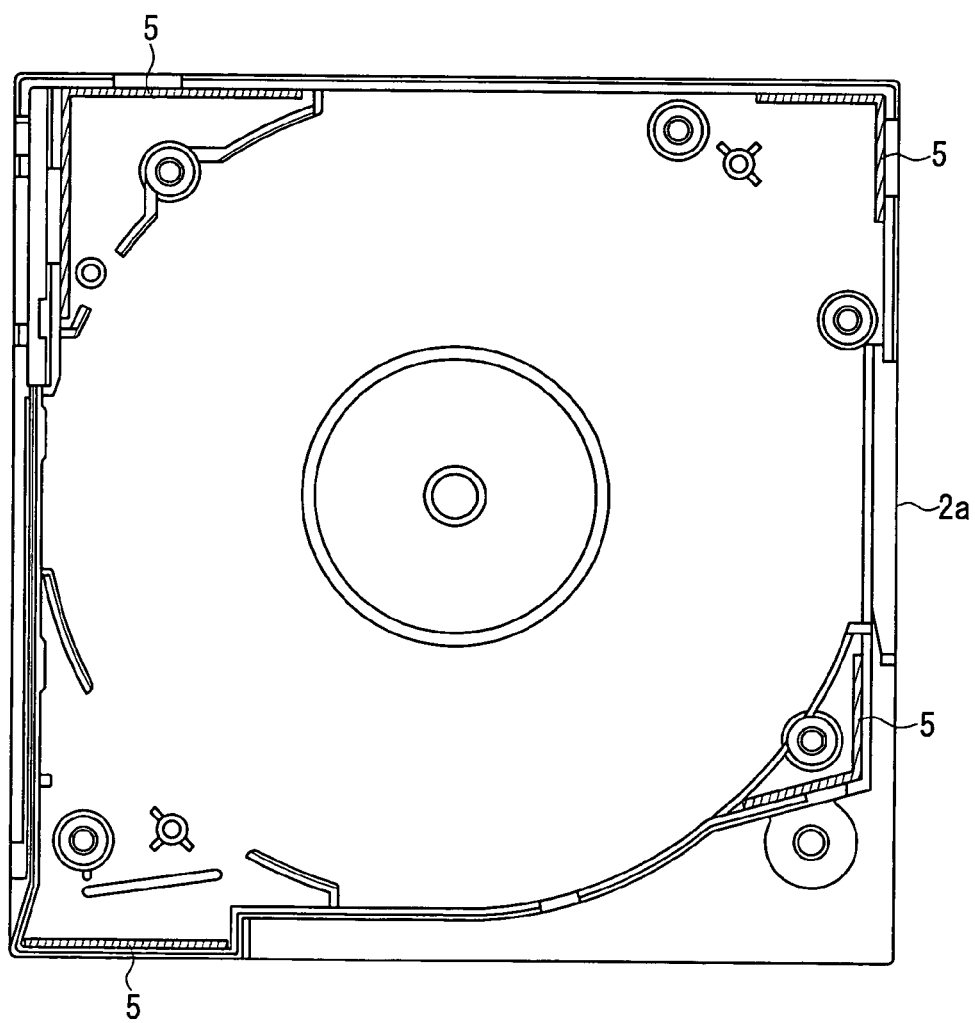
FIG. 6 is a plan view showing the inside of another exemplary first container of the recording medium built-in cartridge of Embodiment 1.
Figure 7:
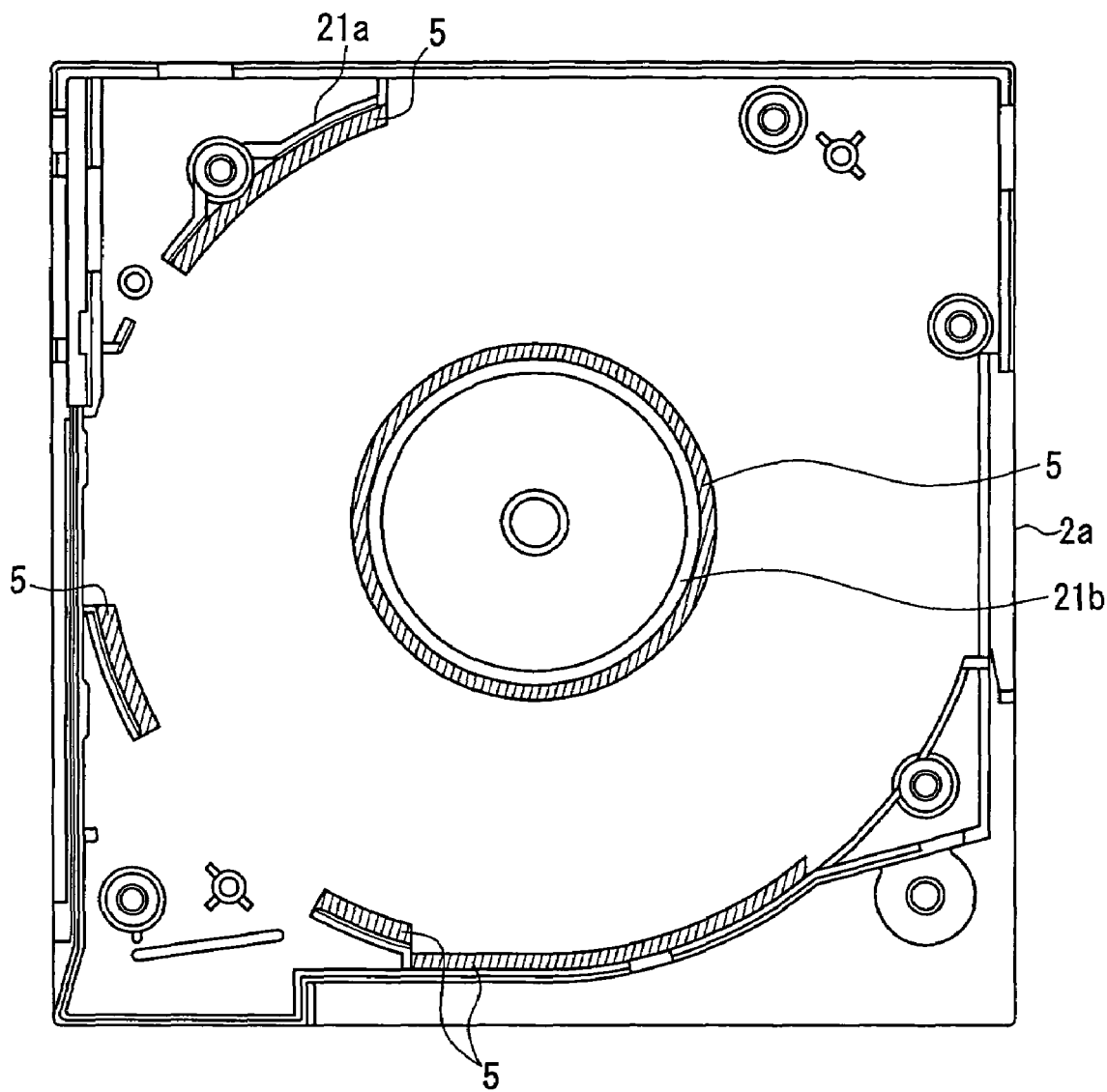
FIG. 7 is a plan view showing the inside of still another exemplary first container of the recording medium built-in cartridge of Embodiment 1.

FIG. 6 and FIG. 7 show the inside of other exemplary first containers 2a of the cartridge 1 of the present embodiment. In FIG. 6 and FIG. 7, the humidity control member 5 is illustrated with hatching. As shown in FIG. 6, the humidity control member 5 in a plate form may be disposed at the corner or in the vicinity of the corner of the first container 2a. More specifically, the humidity control member 5 may be bonded, for example, to the inner face of a side wall making up the first container 2a. Alternatively, as shown in FIG. 7, the humidity control member 5 in a sheet form may be disposed in the vicinity of the outer edge or in the vicinity of the inner edge of the wound body 8 (see FIG. 2) so as to not come into contact with the wound body. More specifically, the humidity control member 5 may be attached to a wall 21a at the face on the wound body side, where the wall 21a rises substantially perpendicularly from the inner face of the bottom part of the first container 2a and is disposed in the vicinity of the outer edge of the wound body for limiting the position of the wound body. Alternatively, the humidity control member 5 may be attached to an annular wall 21b at the face on the wound body side, where the annular wall 21b rises substantially perpendicularly from the inner face of the bottom part of the first container 2a and is disposed in the vicinity of the inner edge of the wound body. The humidity control member may be attached at multiple locations. In this way, as long as the humidity control member 5 is disposed in the vicinity of the wound body 8 so as not to interfere with the rotation of the wound body 8, the humidity control member 5 may be disposed at any position.

When a force of impact is imparted to the cartridge 1 by a fall or the like, the reel may become deformed by the impact, and in the worst case, the tape 6 may become deformed. The humidity control member 5, disposed in the vicinity of the outer edge of the wound body or in the vicinity of the inner edge of the wound body, may provide an impact absorption function, whereby the impact resistance of the cartridge 1 can be enhanced in the example of FIG. 7.

In the example of FIG. 2, the reel 7 is provided with the first flange 7b and the second flange 7c. However, in the cartridge of the present embodiment, at least one of them may be omitted.

Preferably, at least one of the shaft part 7a, the first flange 7b and the second flange 7c, more preferably both of the first flange 7b and the second flange 7c, has a through hole formed so as to penetrate therethrough in the thickness direction of them. Such a through hole will improve the air circulation in the case 2, whereby the humidity control effect by the humidity control member 5 can be enhanced in the uniformity.

EMBODIMENT 2

In Embodiment 2, a tape cartridge is exemplified as another example of the cartridge of the present invention.

Figure 8:
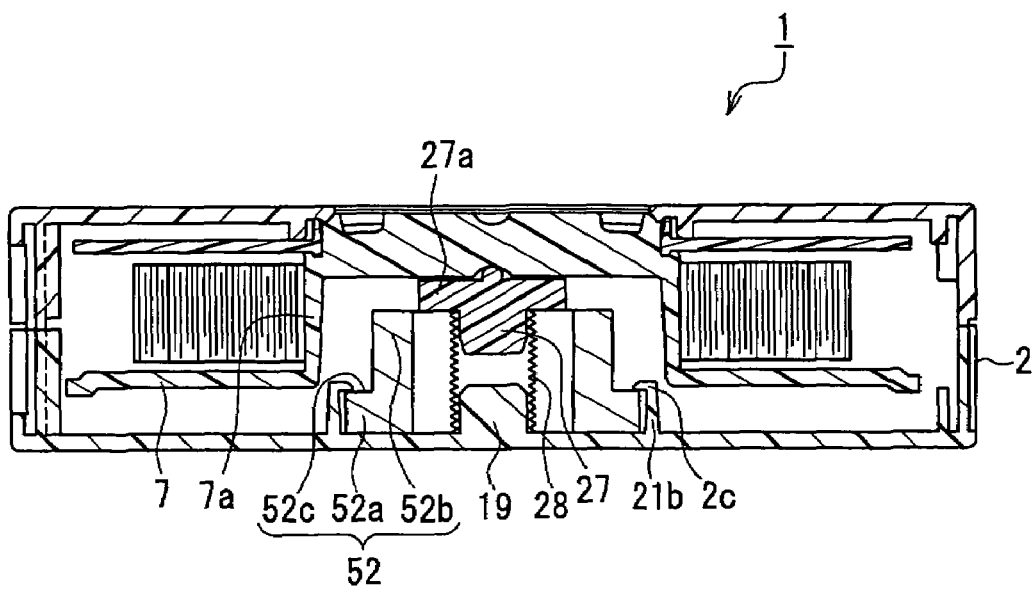
FIG. 8 is a cross-sectional view of an exemplary recording medium built-in cartridge of Embodiment 2.
Figure 9A:
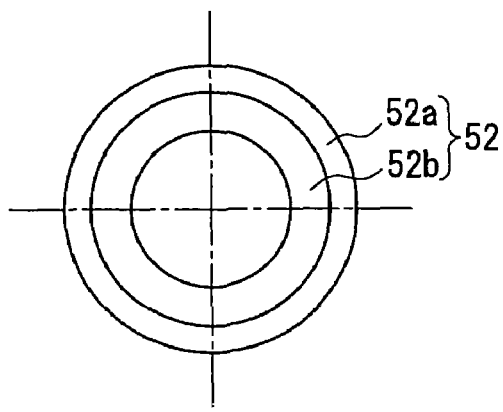
FIG. 9A is a plan view of a humidity control member making up the recording medium built-in cartridge of FIG. 8.
Figure 9B:
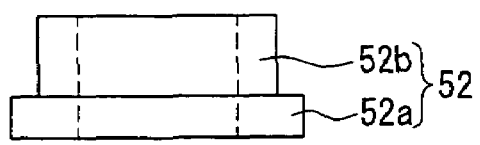
FIG. 9B is a side view of the humidity control member of FIG. 9A.

FIG. 8 is a cross-sectional view of an exemplary cartridge of the present embodiment, FIG. 9A is a plan view of a humidity control member making up the cartridge of the present embodiment and FIG. 9B is a side view of the humidity control member of FIG. 9A.

As shown in FIG. 8 to FIG. 9B, the cartridge 1 has a configuration similar to that of the cartridge of Embodiment 1 except for the following (1) to (3), and has similar effects. Similar materials also can be used.

(1) In the cartridge 1 of the present embodiment, a humidity control member 52 includes a large-diameter part 52a and a small-diameter part 52b and has a cylindrical shape with a hollow therein. Since the humidity control member 52 has the large-diameter part 52a and the small-diameter part 52b, it also has a step face 52c. Such a humidity control member 52 can be handled more easily than a humidity control member in a sheet form, and has reduced risk of a breakage or the like. A compression coil spring 28 having the outer diameter smaller than the inner diameter of the humidity control member 52 is inserted into a bore of the humidity control member 52. Further, in order not to hamper the vertical motion of the reel 7 in the case 2, the inner diameter of the humidity control member 52 is larger than the outer diameter of a base plate 27a of a shaft 27 that receives one end of the compression coil spring 28.

(2) In the cartridge 1 of the present embodiment, the case 2 is provided with a snap-fit part 2c. The snap-fit part 2c is, for example, a hook part provided at the tip end of the annular wall 21b that rises substantially perpendicularly from the inner face of the bottom part of the first container 2a. By letting the large-diameter part 52a of the humidity control member 52 inwardly beyond this hook part and engage with the inside of the annular wall 21b, the humidity control member 52 can be secured to the case 2. In this way, the snap-fit method using the snap-fit part 2c, which is for securing the humidity control member 52 to the case 2, can improve the workability of the assembly for the cartridge 1.

(3) In the cartridge 1 of the present embodiment, the humidity control member 52 is disposed in the hollow of the shaft part 7a of the reel 7 in order not to interfere with the motion of the reel 7. Since there is a relatively wide dead space within the hollow of the shaft part 7a, by disposing the humidity control member 52 in the hollow of the shaft part 7a, the humidity control member 52 can be provided in the case 2 without changing the shape of other elements in the cartridge 1, their arrangement and the like. Further, in the present embodiment, the humidity control member 52 making up the cartridge 1 has a large capacity, and therefore it is excellent in the moisture absorption/emission properties. The humidity control member 52 can be obtained by compression molding of the powder of the moisture control material using gas or the like.

EMBODIMENT 3

In Embodiment 3, a tape cartridge is exemplified as still another example of the cartridge of the present invention.

Figure 10:
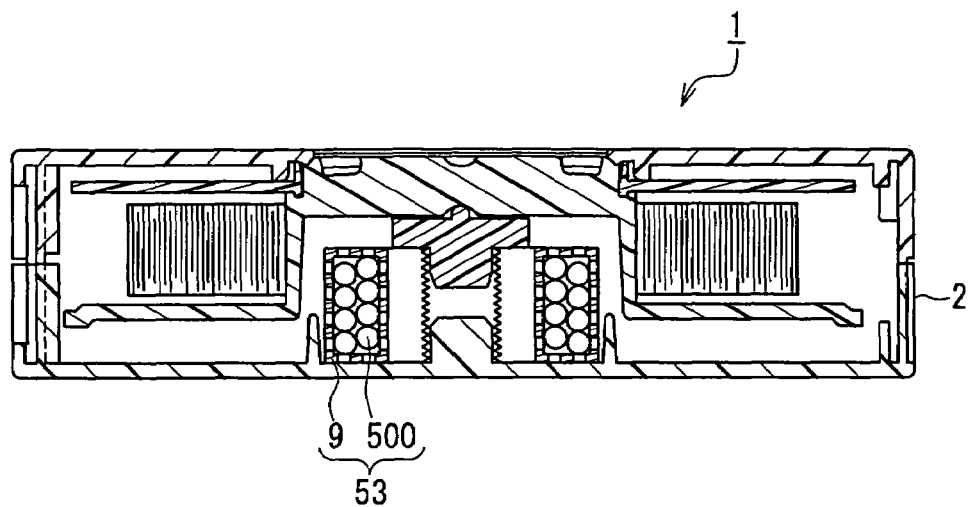
FIG. 10 is a cross-sectional view of an exemplary recording medium built-in cartridge of Embodiment 3.
Figure 11A:
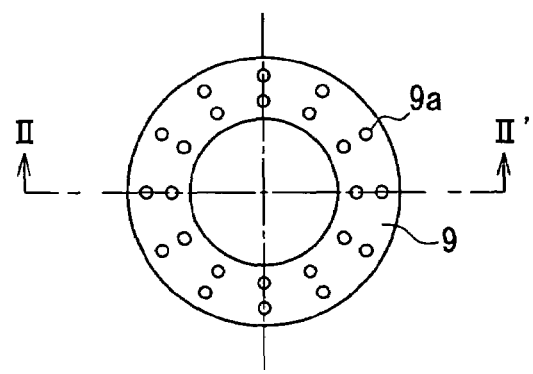
FIG. 11A is a plan view of a humidity control member making up the recording medium built-in cartridge of FIG. 10.
Figure 11B:
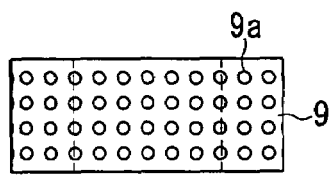
FIG. 11B is a side view of the humidity control member of FIG. 11A.
Figure 11C:
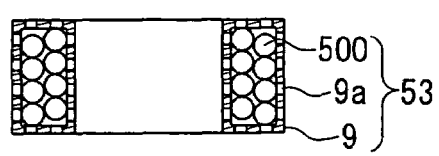
FIG. 11C is a cross-sectional view of the humidity control member of FIG. 11A taken along II-II' of FIG. 11A.

FIG. 10 is a cross-sectional view of a cartridge of the present embodiment. FIG. 11A is a plan view of a humidity control member making up the cartridge of the present embodiment, FIG. 11B is a side view of the humidity control member of FIG. 11A and FIG. 11C is a cross-sectional view of the humidity control member of FIG. 11A taken along II-II' of FIG. 11A.

In a cartridge 1 of the present embodiment, a humidity control member 53 used includes a humidity control material 500 in a powder form and a container 9 that contains the humidity control material 500. The container 9 has through holes 9a whose diameter is smaller than the particle diameter of the humidity control material 500, and therefore the moisture absorption and emission by the humidity control material 500 are enabled in the case 2, while suppressing the scattering of the humidity control material 500.

Since the powder form humidity control material is used as the humidity control member 53 of FIG. 11, a larger surface area effective for the moisture absorption and emission can be provided.

The container 9 may be one having form stability made of a thermoplastic resin, a thermosetting resin or the like, or may be like a bag made of a non-woven cloth or the like.

The method for securing the humidity control member 53 is not limited especially, and similarly to Embodiment 1, this may be secured by adhesion using an adhesive, ultrasonic welding and the like, for example. Alternatively, the snap-fit method described in Embodiment 2 may be used.

The cartridge 1 of the present embodiment has a configuration similar to that of the cartridge of Embodiment 2 except for the above, and has similar effects. Similar materials also can be used.

EMBODIMENT 4

In Embodiment 4, a tape cartridge is exemplified as a further example of the cartridge of the present invention.

Figure 12:
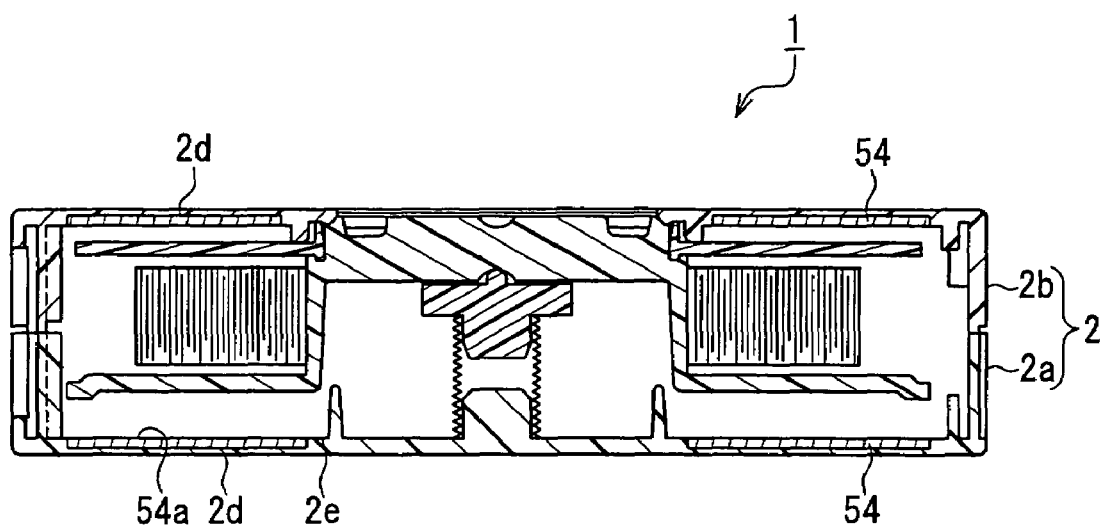
FIG. 12 is a cross-sectional view of an exemplary recording medium built-in cartridge of Embodiment 4.

FIG. 12 is a cross-sectional view of a cartridge of the present embodiment.

In a cartridge 1 of the present embodiment, humidity control members 54 are disposed so as to be contained in concavities or depressions 2d formed in the bottom part of a first container 2a and the bottom part of a second container 2b. A face 54a of the humidity control member 54 facing a wound body is substantially coplanar with a face 2e of the inner faces of the case 2 that is adjacent to the humidity control member 54. Similarly to the humidity control member making up the cartridge of Embodiment 1, the humidity control members 54 are in a sheet form or in a plate form.

When the humidity control member 54 is disposed so as to be contained in the concavity or depression 2d included in at least one of the bottom part of the first container 2a and the bottom part of the second container 2b, the humidity control member 54 can be provided in the case 2 without changing the shape of other elements in the cartridge 1, their arrangement and the like. For that reason, the cartridge 1 of the present embodiment is particularly suitable for a low-profile case 2.

The humidity control member 54 can be secured to the first container 2a or the second container 2b as follows. After the humidity control member 54 is disposed in a dye for molding the first container 2a or the second container 2b, the molding of the first container 2a or the second container 2b may be performed by insert molding or the like. Needless to say, the method for securing the humidity control member 54 to the case 2 is not limited to this, and other methods such as adhesion using an adhesive and ultrasonic welding may be used.

The cartridge 1 of the present embodiment has a configuration similar to that of the cartridge of Embodiment 1 except for the above, and has similar effects. Similar materials also can be used.

EMBODIMENT 5

In Embodiment 5, an exemplary cartridge built-in package of the present invention is described.

Figure 13:
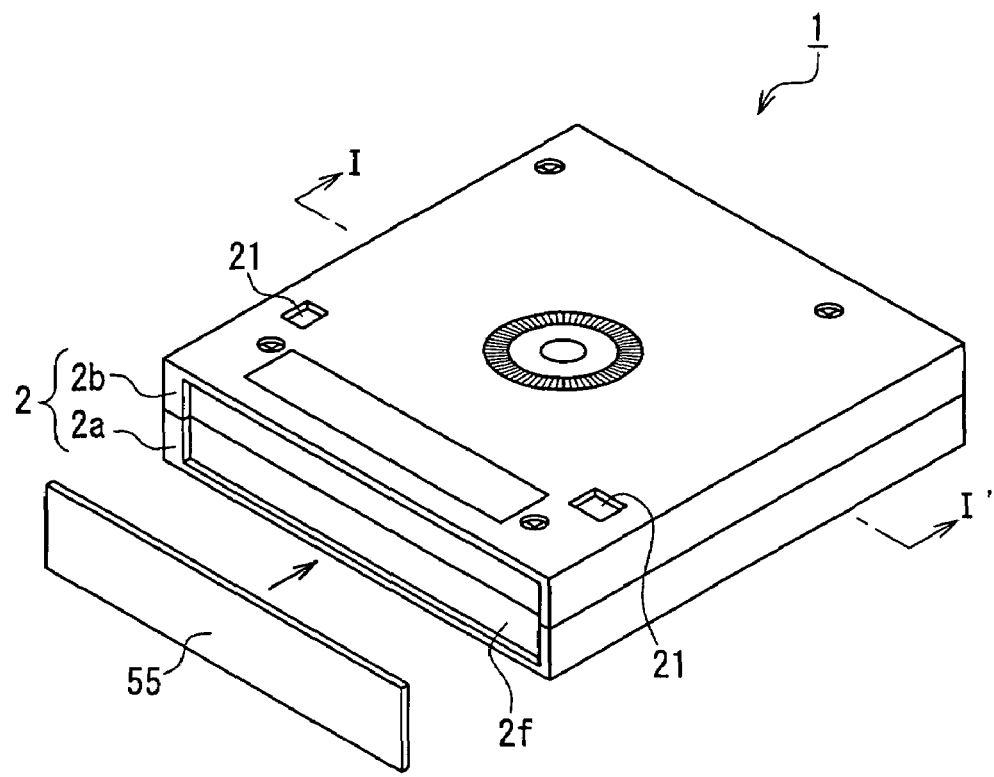
FIG. 13 is a perspective view of an exemplary recording medium built-in cartridge making up a cartridge built-in package of Embodiment 5.
Figure 14:
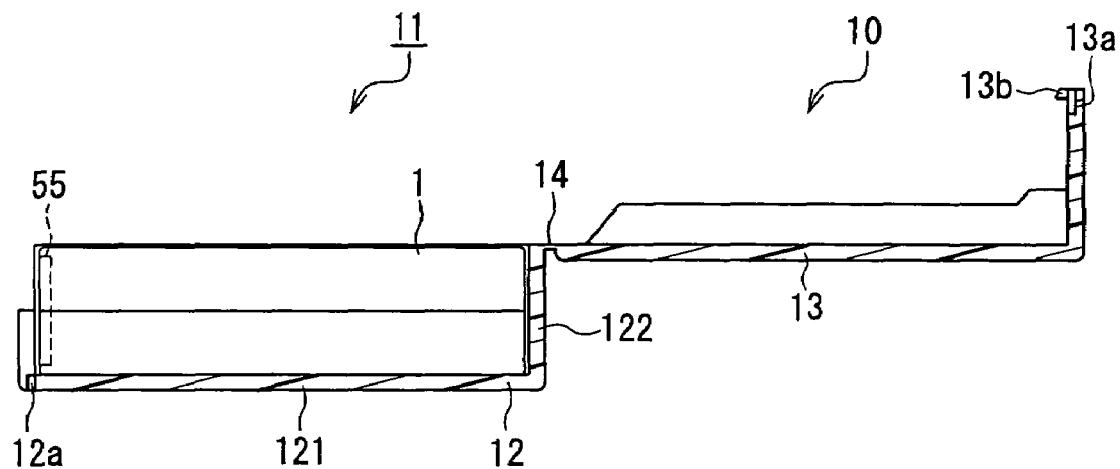
FIG. 14 shows an exemplary cartridge built-in package of Embodiment 5, which is a partial cross-sectional view showing the state where a housing case is opened.
Figure 15:
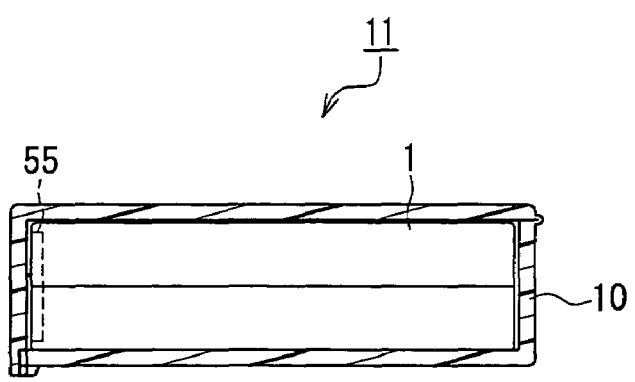
FIG. 15 shows an exemplary cartridge built-in package of Embodiment 5, which is a partial cross-sectional view showing the state where a housing case is closed.

FIG. 13 is a perspective view of an exemplary cartridge making up the cartridge built-in package of the present embodiment. FIG. 14 shows an exemplary cartridge built-in package of the present embodiment, which is a partial cross-sectional view showing the state where a housing case is opened. FIG. 15 shows an exemplary cartridge built-in package of the present embodiment, which is a partial cross-sectional view showing the state where a housing case is closed.

As shown in FIG. 14 and FIG. 15, the cartridge built-in package 11 of the present embodiment includes a cartridge 1 and a housing case 10. The cartridge 1 can be loaded or unloaded with respect to the housing case 10, and the housing case 10 is capable of housing the cartridge in an enclosed space. As shown in FIG. 13, the cartridge 1 is provided with a case 2 and a magnetic tape (not illustrated) housed in the case 2. The cartridge 1 is provided with a humidity control member 55 secured to the outer surface of the case 2. Further, the case 2 has air vents 21 formed for enabling the communication between the inside and the outside of the case 2. The air vents 21 may be one provided for the purpose of the engagement with the drive or the identification by the drive, or may be provided separately from them.

The humidity control member 55 is attached to the case 2 and includes a humidity control material disposed at the face opposite to the face on the side of the case 2.

In the state where the cartridge 1 is housed in the housing case 10 and the housing case 10 is closed, when the humidity in the housing case 10 is a first humidity or higher, the humidity control material absorbs the moisture in the housing case 10. When the humidity in the housing case 10 is a second humidity or lower, the second humidity being lower than the first humidity, the humidity control material emits the moisture to the housing case 10. Preferable values for the first humidity and the second humidity are similar to the first humidity and the second humidity in Embodiment 1.

Since the air vents 21 for enabling the communication between the inside and the outside of the case 2 are formed in the case 2 of the cartridge 1, the communication of the air through the case 2 is performed via the air vents 21. Therefore, when the cartridge 1 contained in the housing case 10 is stored, the humidity in the cartridge 1 becomes closer to the humidity in the housing case 10, and finally becomes equal to that.

Therefore, when the humidity in the housing case 10 or the humidity in the housing case 10 and the cartridge 1 changes with a change of the humidity in the storage surroundings, the humidity control member 55 absorbs or emits the moisture, whereby the humidity in the housing case 10 and in the case 2 can be kept always within a predetermined range.

In this way, according to the cartridge built-in package 11 of the present embodiment, the humidity in the case 2 can be kept within a predetermined range. Therefore, according to the cartridge built-in package 1 of the present embodiment, the degradation of a magnetic tape due to a humidity change in the case 2 can be suppressed, and therefore the reliability thereof is high Humidity control materials similar to those described in Embodiment 1 can be used for the material of the humidity control member 55 used in the cartridge built-in package 11 of the present embodiment.

The amount of the humidity control material contained in the humidity control member 55 is not limited especially, and this may be determined appropriately with consideration given to the capacity of the housing case 10, the capacity of the case 2 of the cartridge 1, the moisture absorption/emission properties of the humidity control material and the like. For instance, if the capacity of the housing case 10 is 300 to 900 $cm^3$ and the capacity of the case 2 is 200 to 800 $cm^3$, then the surface area of the humidity control member 55 effective for the humidity control preferably is 20 $cm^2$ to 200 $cm^2$. In this instance, if Wakkanai diatomaceous earth is used as the humidity control material, the humidity control member 55 preferably contains 80 to 100 volume % of the Wakkanai diatomaceous earth.

This Wakkanai diatomaceous earth increases rapidly in the coefficient of the moisture absorption at the humidity of about 80% when the temperature is 10° C., and has a high coefficient of the moisture absorption at a high humidity. Therefore, the Wakkanai diatomaceous earth exhibits the moisture absorption function when the humidity in the housing case 10 is 80% or higher, and exhibits the moisture emission function when the humidity is 40% or lower. Further, similarly at the temperature of 60° C., the Wakkanai diatomaceous earth exhibits the moisture absorption function when the humidity in the housing case 10 is 80% or higher, and exhibits the moisture emission function when the humidity is 40% or lower. Although the moisture content in the air changes with a temperature, the moisture absorption/emission properties of the humidity control material themselves do not change. With the use of the humidity control member containing such diatomaceous earth as the humidity control material, the humidity in the housing case 10 and in the case 2 of the cartridge 1 can be kept within a range of more than 40% and less than 80% when the temperature ranges from 10° C. to 60° C.

The shape of the humidity control member 55 is not limited especially, and a shape enabling a larger surface area effective for the humidity control is preferable. For instance, a sheet form or a plate form, by which the surface area can be ensured easily, is preferable. The humidity control member 55 in the sheet form or the plate form is preferable also because it can be disposed in a limited space. As shown in FIG. 13, the humidity control member 55 is rectangular in the plan view. However, this is not the limiting example, and any shape such as circular or polygonal is possible.

Similarly to Embodiment 1, the method for securing the humidity control member 55 to the case 2 is not limited especially, and this may be secured by adhesion using an adhesive, ultrasonic welding and the like, for example.

In the example of FIG. 13, a concave 2f is formed in the outer surface of the case 2, and the humidity control member 55 is disposed so as to be contained in this concave 2f. Thus, the humidity control member 55 can be provided in the case 2 without changing the shape of the housing case 10 or the like.

In the example of FIG. 13, the air vents 21 are formed at two positions of the case. However, the number of the air vents 21 is not limited especially. The number of the air vents 21 may be one or three or more.

As shown in FIG. 14, a housing part 12 of the housing case 10 has a bottom plate 121 that is rectangular in the planar shape and is slightly larger in size than that of the cartridge 1 to be housed and a plurality of side walls 122 rising from this bottom plate 121. The housing part 12 is formed so as to allow the cartridge 1 to fit inside substantially.

The housing case 10 is provided with a hinge part 14 allowing a lid part 13 to be coupled with the housing part 12 so as to open and close the housing part 12. When the lid part 13 of the housing case 10 is overlaid on the housing part 12, an engagement groove 13a and an engagement projection 12a engage with each other, and an engagement protrusion 13b engages with the bottom face of the housing part 12. Thereby, the housing case 10 can be kept in the closed state.

The material of the housing case 10 is not limited especially, and conventionally well-known materials for the housing case 10 may be used. For instance, resins such as polypropylene (PP), polystyrene (PS), polyethylene (PE) and acrylonitrile-butadiene-styrene copolymer (ABS) are preferable.

In Embodiments 1 to 5, the magnetic tape is exemplified for the description of the recording medium. However, in the present invention, the recording medium is not limited to the magnetic tape. The recording medium may be a magnetic disk, IC memory or the like, for example.

Further, in all of the Embodiments 1 to 5, the case 2 is molded using a resin such as polycarbonate. However, the case 2 may be molded using a resin to which at least one type of humidity control material selected from the group consisting of B-type silica gel, diatomaceous earth, sepiolite, zeolite, coal ash, porous ceramics, charcoal and ultrahigh molecular weight polyethylene is added. Alternatively, a coating containing at least one humidity control material may be applied to the case 2. When more than one humidity control material is used, the materials may be admixed or segregated.

As stated above, according to the present invention, a recording medium built-in cartridge capable of keeping the humidity in a case within a predetermined range and such a cartridge built-in package can be provided.

According to the present invention, since the humidity in the case of the cartridge can be kept within a predetermined range, the present invention is effective in the field of a recording medium cartridge provided with a recording medium such as a magnetic tape, a magnetic disk or IC memory.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A recording medium built-in cartridge, comprising:
a case;
a recording medium housed in the case; and
at least one humidity control member disposed in the case and comprising at least one humidity control material that absorbs moisture in the case when a humidity in the case is a first humidity or higher and emits the moisture to the case when the humidity in the case is a second humidity or lower, the second humidity being lower than the first humidity,
wherein the humidity control member is in a sheet form or in a plate form,
the humidity control member is a laminate comprising two or more layers, and
one outermost layer of the laminate is a humidity control layer comprising the humidity control material and the other outermost layer is an adhesive layer.

2. The recording medium built-in cartridge according to claim 1, wherein the recording medium is a magnetic tape.

3. The recording medium built-in cartridge according to claim 2, further comprising a reel that is disposed rotatably in the case,
wherein the magnetic tape is wound around the reel.

4. The recording medium built-in cartridge according to claim 1, wherein the humidity control material comprises at least one type of porous material selected from the group consisting of B-type silica gel, diatomaceous earth, sepiolite, zeolite, coal ash, porous ceramics, charcoal and ultrahigh molecular weight polyethylene.

5. The recording medium built-in cartridge according to claim 1, wherein the humidity control material comprises diatomaceous earth.

6. The recording medium built-in cartridge according to claim 1, wherein a surface area of the humidity control member in a direction of a principal surface of the case is larger than a surface area of the humidity control member in a thickness direction of the case.

7. The recording medium built-in cartridge according to claim 1,
wherein the case comprises a first container and a second container, and
the humidity control member is disposed between the magnetic tape and at least one of a bottom part of the first container and a bottom part of the second container.

8. The recording medium built-in cartridge according to claim 7,
wherein at least one of the first container and the second container includes a concavity, and
the humidity control member is disposed so that the concavity contains the humidity control member.

9. The recording medium built-in cartridge according to claim 1,
wherein the first humidity is a predetermined humidity within a range from 70% to 90%, and the second humidity is a predetermined humidity within a range from 30% to 50%.

10. The recording medium built-in cartridge according to claim 1, wherein a humidity in the case of the recording medium built-in cartridge is within a range more than 30% and less than 90% at a temperature from 10° C. to 60° C.

11. A recording medium built-in cartridge comprising:
a case;
a recording medium housed in the case;
at least one humidity control member disposed in the case and comprising at least one humidity control material that absorbs moisture in the case when a humidity in the case is a first humidity or higher and emits the moisture to the case when the humidity in the case is a second humidity or lower, the second humidity being lower than the first humidity; and
an indicator whose color tone changes with a humidity change in the case,
wherein the indicator can be observed from the exterior of the case.

12. The recording medium built-in cartridge according to claim 11, wherein a humidity in the case of the recording medium built-in cartridge is within a range more than 30% and less than 90% at a temperature from 10° C. to 60° C.

13. A recording medium built-in cartridge comprising:
a case;
a recording medium housed in the case;
at least one humidity control member disposed in the case and comprising at least one humidity control material that absorbs moisture in the case when a humidity in the case is a first humidity or higher and emits the moisture to the case when the humidity in the case is a second humidity or lower, the second humidity being lower than the first humidity; and
a reel that is disposed rotatably in the case,
wherein the recording medium is a magnetic tape,
the reel, around which the magnetic tape is wound, comprises a shaft part with a hollow therein, and
the humidity control member is disposed in the hollow of the shaft part.

14. The recording medium built-in cartridge according to claim 13, wherein a humidity in the case of the recording medium built-in cartridge is within a range more then 30% and less than 90% at a temperature from 10° C. to 60° C.

15. A cartridge built-in package, comprising:
a recording medium built-in cartridge including a case having an air vent and a recording medium housed in the case;
a housing case in which the recording medium built-in cartridge is housed so that the recording medium built-in cartridge can be loaded or unloaded with respect to the housing case; and
at least one humidity control member secured to an outer surface of the case of the recording medium built-in cartridge and comprising at least one humidity control material that absorbs moisture in the housing case when a humidity in the housing case is a first humidity or higher and emits the moisture to the housing case when the humidity in the housing case is a second humidity or lower, the second humidity being lower than the first humidity,
wherein the humidity control member is in a sheet form or in a late form,
the humidity control member is a laminate comprising two or more layers, and
one outermost layer of the laminate is a humidity control layer comprising the humidity control material, and the other outermost layer is an adhesive layer.

16. The cartridge built-in package according to claim 15, wherein the humidity control material comprises at least one type of porous material selected from the group consisting of B-type silica gel, diatomaceous earth, sepiolite, zeolite, coal ash, porous ceramics, charcoal and ultrahigh molecular weight polyethylene.

17. The cartridge built-in package according to claim 15, wherein the humidity control material comprises diatomaceous earth.

18. The cartridge built-in package according to claim 15, wherein a humidity in the case of the recording medium built-in cartridge is within a range more than 30% and less than 90% at a temperature from 10° C. to 60° C.

19. The cartridge built-in package according to claim 15, further comprising an indicator whose color tone changes with a humidity change in the case,
wherein the indicator can be observed from the exterior of the case.

* * * * *